United States Patent [19]

Miller

[11] Patent Number: 4,469,047

[45] Date of Patent: Sep. 4, 1984

[54] APPARATUS AND METHOD FOR INJECTING EGGS

[76] Inventor: Gary E. Miller, 5369 Baldwin Park, Murray, Utah 84123

[21] Appl. No.: 545,204

[22] Filed: Oct. 25, 1983

[51] Int. Cl.³ .............................................. A01K 45/00
[52] U.S. Cl. ...................................................... 119/1
[58] Field of Search .......................................... 119/1

[56] References Cited

U.S. PATENT DOCUMENTS 3,377,989  4/1968  Sandhage et al. ...................... 119/1
4,040,388  8/1977  Miller ...................................... 119/1

Primary Examiner—Hugh R. Chamblee
Attorney, Agent, or Firm—Geoffrey R. Myers; Darle M. Short

[57] ABSTRACT

An egg injection machine is provided which includes a needle assembly, a needle plate assembly, a solenoid assembly and an egg positioning assembly. The needle plate assembly is located above the egg positioning assembly and includes a movable plate (having up and down positions), a stationary plate and a spring located therebetween which is biased to push the movable plate away from the stationary plate. The solenoid assembly is connected to the movable plate and controls the movement of the movable plate. The needle assembly is fixedly attached to the movable plate such that it moves between a retracted position and an injection position as the movable plate moves. The egg positioning assembly also includes a second movable and a second stationary plate, between which the egg is positioned. A shock absorber and a speed controller are attached to one of those latter plates. In operation, the needle assembly rapidly decelerates towards the egg. The movable plate of the needle plate assembly contacts the shock absorbers during this descent which decelerates this movable plate immediately after the needle penetrates the egg shell to a slower velocity. The movable plate then contacts the speed controller which functions to continue the downward movement of the movable plate at this slower velocity, until the needle has penetrated the egg a desired distance. The injecting material is then passed through the needle assembly into the egg and the needle assembly is retracted from the egg.

18 Claims, 4 Drawing Figures

APPARATUS AND METHOD FOR INJECTING EGGS

FIELD OF THE INVENTION

This invention relates to an apparatus and method for treating embryonated eggs that are almost fully developed (typically 2 to 5 days prior to hatch) by automatically introducing vaccines, antibiotics, hormones, vitamins, or the like through the large end of the egg. More particularly, this apparatus and method enables the fluid to be injected through the air cell membrane into the amniotic fluid without damaging the embryo.

BACKGROUND OF THE INVENTION

It is standard practice in commercial chicken and turkey hatcheries to inoculate day-old birds so as to protect them from the many infectious diseases which affect mortality and meat quality. The principal method of inoculation has been to manually inject the young birds with a suitable antibiotic or vaccine using a hypodermic needle and syringe.

Another method of inoculation that is being employed now by most turkey hatcheries is to dip hatching eggs in an antibiotic solution prior to incubation. This is done mainly to combat a disease peculiar to turkeys known as Mycoplasma Melangridis (MM) and to help control other detrimental organisms which could affect the percentage of eggs hatched and the chances of survival after hatch.

In dipping, a temperature differential or vacuum is used to force the antibiotic solution through the shell of the egg. Although the benefits derived from this method make its use worthwhile, there is very little control of the dose volume. This is due to varying shell porosity and thickness. Thus, some eggs receive too much antibiotic, causing toxic embryonic death, and others do not receive an amount sufficient to be effective.

A method of egg inoculation prior to incubation which eliminates the problem of precise volume control associated with dipping involves the use of a hypodermic needle and syringe to inject known quantities of antibiotic into the eggs by hand. The operator uses a drill or other instrument to make a small hole in the shell and then inserts a hypodermic needle through the hole and injects a precise amount of solution into the egg. After the needle is retracted from the egg, the hole is sealed with a wax or cement. This is a slow and meticulous process which is very labor intensive, expensive and subject to human error.

Recognizing the need to be able to inoculate baby turkeys while the turkeys were still in their eggs, and further recognizing the ineffectiveness and inefficiency of the prior apparatus and methods for performing such immunizations, I invented an automatic egg injection machine and method which is patented in U.S. Pat. No. 4,040,388, issued Aug. 9, 1978 and entitled "METHOD AND APPARATUS FOR AUTOMATIC EGG INJECTION".

In devices according to this patented invention, a plurality of eggs resting in a tray having an apertured bottom are injected from below by a plurality of vertically disposed needle assemblies carried by a vertically movable injection device. In an up or injection position, the needle assemblies abut the lower ends of the eggs. When the needle assemblies are first brought into abutment with the eggs, heating elements in the needle assemblies are activated to sterilize portions of the shells. Next, each individual needle is moved upwardly out of its respective needle assembly so as to puncture the shells at the sterilized areas. A separate drive means is provided for each needle. Subsequently, the liquid vaccine is injected through the needles, the needles are withdrawn and the heating elements are activated to coagulate the albumin at the location of the injection holes so as to seal the holes.

It soon became apparent that this method and apparatus had certain limitations and risks involved with the use thereof. Therefore I invented yet another egg injection method and apparatus, with Perry Sheeks, which is the subject of U.S. patent application Ser. No. 383,839, filed June 1, 1982 and entitled "EGG INJECTION METHOD AND APPARATUS".

The egg injection devices according to that invention employ multiple needle assemblies fixed to a common vertically-movable needle plate to inject a tray of eggs. The needle plate and assemblies are located beneath the tray of eggs and inject the eggs through the bottom of the tray. The needle plate is accelerated rapidly upwardly by a single drive device thereby simultaneously moving all of the needle assemblies. The needles impact the eggs at a high velocity, the penetrating ends of the needles acting as cutting dies that cause small circular discs the same diameter as the needles to be sheared away from the shell. After the needles enter the egg, the needle plate engages a shock absorber system that slows the needle plate to zero velocity over a short distance (typically ⅛"), without subjecting the eggs to damaging shock. The injection fluid is then passed through the needle assemblies and injected into the eggs. This feature of multiple needles attached to a common needle plate enable an entire tray of eggs to be pierced and inoculated simultaneously.

The machines and methods of the invention disclosed in this pending application, as well as the machines and methods according to U.S. Pat. No. 4,040,388 are designed and function to inject the injection fluid into the smaller end of the egg.

However, there are instances where it is desirable to inject into the large end of the egg. For example, in one application involving chicken eggs, it is desirable to deposit a vaccine in close proximity to the nostrils of the developing embryo at the large end of the egg. Specifically, the chicken industry currently injects manually over 4 billion day old chickens each year with a vaccine to control what is called Merek's disease. It takes a few days for the vaccine to become effective and a percentage of the chicks that are exposed soon after hatching still catch the disease. The United States Department of Agriculture has recently shown that by injecting the eggs 3 days prior to hatch, the chicks are protected from Merek's disease by the time they hatch so they overcome early exposure to the disease much better than chicks vaccinated at hatching.

The embryo vaccination work by the United States Department of Agriculture was performed by hand and, as such, was very labor intensive and expensive. I therefore became aware of the need in the industry for an egg injection machine and an injection method which would vaccinate eggs through their larger ends automatically and more economically as compared to the hand injection method.

This invention fulfills this need in the art, and other need will become apparent to the skilled artisan once given the following disclosure:

SUMMARY OF THE INVENTION

Generally speaking this invention provides an egg injection machine comprising a needle assembly having a needle; said needle assembly being movable between a retracted and an injection position; means for positioning an egg such that said egg will be contacted by said needle when said needle assembly is in the injection position; means for supplying matter to said needle assembly for injection into said eggs; means for accelerating said needle assembly as said needle assembly moves from the retracted toward the injecting position; means for decelerating said needle assembly immediately after said needle has pierced the shell of said egg to a slow velocity; means for continuing said needle into said egg at said slow velocity until said needle has pierced said egg a predetermined distance, and means for retracting said needle from said egg.

In some embodiments of this invention, the means for positioning the egg includes a first stationary plate spaced from a first movable plate, the egg being positioned therebetween. The first movable plate is movable between at least two positions, including a position wherein the first movable plate pushes and holds the egg in abutment with the first stationary plate.

In certain other embodiments, the means for accelerating the needle assembly includes a second stationary plate spaced from a second movable plate, the needle assembly being fixedly attached to the second movable plate. The accelerating means may further include a spring located between these latter plates, said spring being biased to push said second movable plate away from said second stationary plate.

In yet other embodiments of this invention, the decelerating means includes a shock absorber, the shock absorber being positioned such that it engages and decelerates the second movable plate immediately after the needle of the needle assembly penetrates the egg shell.

In further embodiments of this invention, the continuing means includes a speed controller which continues the second movable plate and the needle assembly at a slow velocity after the second movable plate and the needle assembly have been decelerated by the shock absorber.

One advantage of the machines and methods according to this invention is that they can be employed to inoculate chick eggs through the large ends of the eggs with minimal risk of inflicting injury to the embryos. This unique and highly desirable (see above) capability is derived from the ability of the machines to immediately decelerate once the egg shell has been penetrated, while continuing the descent of the needle at a relatively slower, controlled velocity until the needle has penetrated the egg by a desired distance into the amniotic fluid in the egg.

When employed to inject the large ends of eggs, the needle assemblies according to this invention will impact the eggs at a relatively high velocity, cutting a clean hole in the egg shell. The needle assembly will then be immediately decelerated after impact to a slower velocity. The needle will then proceed into the egg at this relatively slow velocity until the tip of the needle passes through the air cell and pierces the air cell membrane; it being noted that the air cell is spaced from the shell at the larger end of poultry eggs. After the air cell membrane has been pierced, the injection matter will be provided to the needle assembly and injected into the amniotic fluid of the egg. The needle is then withdrawn from the egg.

The employment of this invention results in minimal risk of injury to the unhatched embryos since if the needle inadvertently contacts the embryo during the insertion thereof, the needle is moving at such a slow velocity that it does not injure the embryo, rather, it gently nudges the embryo out of its path. Moreover, by employing this machine to inject the large ends of eggs, the vaccine is injected in the eggs proximate to the nostrils of the embryos for more certain absorption of the vaccine by the embryo.

Certain embodiments of this invention will now be described in detail with respect to the drawings wherein:

DETAILED DESCRIPTION OF THE DRAWINGS

Figure 1:
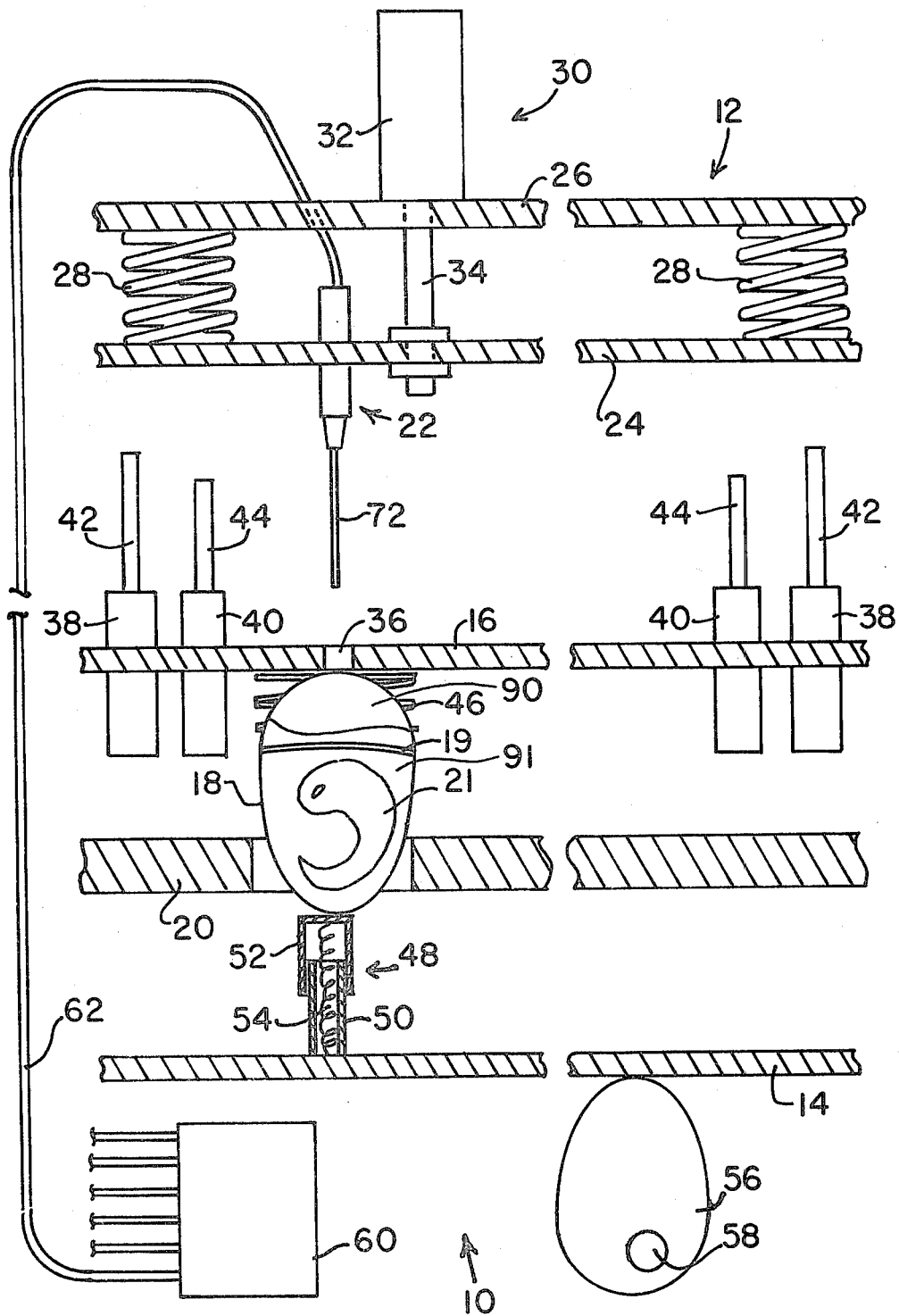
FIG. 1 is a partial elevation view, partially cross sectioned, of one embodiment of this invention, illustrating the egg injection apparatus in the up or retracted position.
Figure 2:
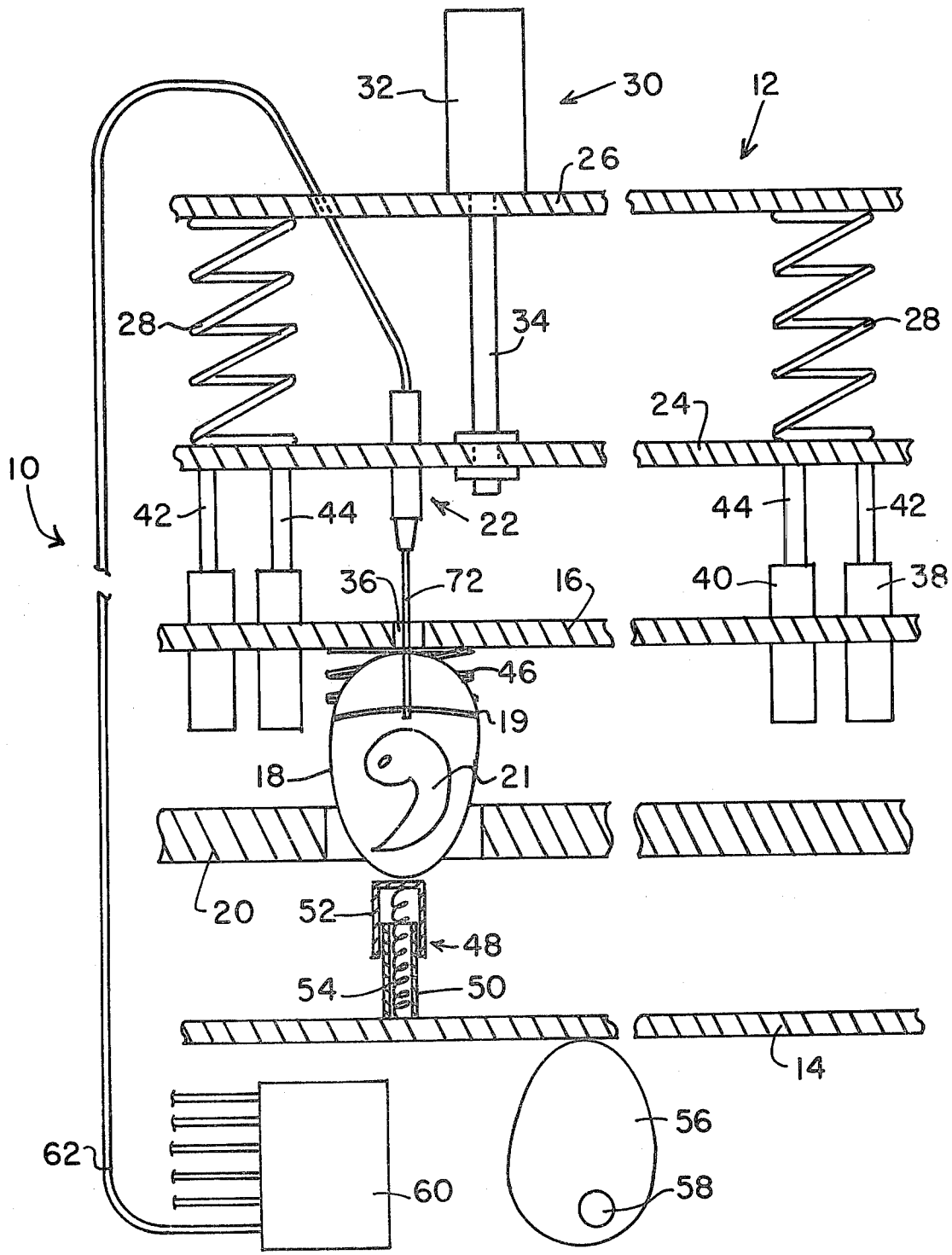
FIG. 2 is a partial elevation view of the embodiment of this invention illustrated in FIG. 1, partially cross-sectioned, illustrating the egg injection apparatus in the down or injecting position.

Referring to the Figures, and in particular FIGS. 1 and 2, an egg injecting machine 10 is illustrated including needle plate assembly 12, bottom plate 14 and stationary plate 16, all attached to a common support structure (not shown). Machine 10 is designed to be employed with a tray of eggs 18, for example tray 20, as shown in FIGS. 1 and 2.

Machine 10 can be employed to inject either chicken or turkey eggs. A tray of eggs is defined by custom and trade in this industry as containing typically 30, 36, 42, 48 or 84 chicken eggs or 20, 25, 36 or 68 turkey eggs.

In this embodiment of the invention, machine 10 is designed and arranged to inject eggs 18 through the larger ends thereof. This is an important feature of machine 10, for the reasons discussed above.

At the time eggs 18 are ready for injecting with a vaccine, eggs 18 contain a developing embryo 21, air cell membrane 19, air cells 90 and amniotic fluid 91.

Needle plate assembly 12 includes lower plate 24, upper plate 26 and springs 28. Upper plate 26 is fixedly attached to the support structure and remains stationary during the operation of machine 10. Springs 28 extend between upper plate 26 and lower plate 24 and are in compression when needle plate assembly 12 is in the position illustrated in FIG. 1, tending to force lower plate 24 downward. Lower plate 24 moves vertically between at least two positions, an up position (as shown in FIG. 1) and a down position (as shown in FIG. 2) as machine 10 is operated.

Machine 10 also includes needle assembly 22, having a needle 72, which is fixedly attached to lower plate 24 and thus moves between retracted (shown in FIG. 1) and injecting (showing in FIG. 2) positions as bottom plate 24 moves between its up and down positions.

Machine 10 further includes solenoid assembly 30 which is comprised of solenoid 32 and arm 34. Solenoid 32 is attached to the top of upper plate 26. Arm 34 slidably extends downward (through upper plate 26) from solenoid 30 and is attached proximate its free end to lower plate 24. Solenoid 32 is a pull-type solenoid such that when it is activated it pulls and holds arm 34 in its uppermost position. When solenoid 32 is deactivated, arm 34 is free to fall.

Stationary plate 16 is fixedly attached to the support structure in a location below needle assembly 22 and needle plate assembly 12. Stationary plate 16 has a number of holes 36 therein located beneath needle assemblies 22, one hole 36 per needle assembly 22, which receive the needles 89 of needle assemblies 22 as needle assemblies 22 move from the retracted position to the injecting position Shock absorbers 38 and speed controllers 40 are fixedly attached to stationary plate 16 and have engaging rods 42 and 44, respectively, extending upward therefrom so that the engaging rods 42 and 44 contact lower plate 24 when lower plate 24 has descended a predetermined distance from its up position shown in FIG. 1.

Stationary plate 16 also has a set of coil springs 46 attached to the underside thereof. There is at least one spring 46 for each egg 18 in tray 20. Springs 46 are centered under holes 36 so as to properly position each egg 18 under a hole 36 and a needle assembly 22.

Bottom plate 14 is slidably attached to the support structure such that it is movable vertically between up and down positions. Egg positioning spring housings 48 are attached to the top side of bottom plate 14 and extend upwardly therefrom. There is at least one egg positioning spring housing 48 for each egg 18 in tray 20.

Egg positioning spring housings 48 include cylinders 50 (which are fixedly attached to lower plate 14), top housings 52 (which are shaped like a cup and placed upside down over cylinders 50) and springs 54 (which extend between bottom plate 14 and top housing 52). Top housings 52 have inner diameters slightly larger than the outer diameters of cylinders 50, such that top housings 52 can slide up and down with respect to cylinders 50 as force is applied and removed from top housings 52.

The movement of bottom plate 14 is regulated by cam plate 56 which is fixedly attached to and operated by rotary shaft 58. Shaft 58 is in turn operated by a motor (not shown). Bottom plate 14 rests on the edge of cam plate 56, as shown in FIGS. 1 and 2, and thus moves up and down as rotary shaft 58 and cam plate 56 rotate.

The vaccine solution which is to be injected into eggs 18 is fed by peristaltic pump 60 through solution tubes 62 into needle assemblies 22. Peristaltic pump 60 has a number of solution tubes 62 attached thereto such that a single pump 60 feeds a number of needle assemblies 22.

Figure 3:
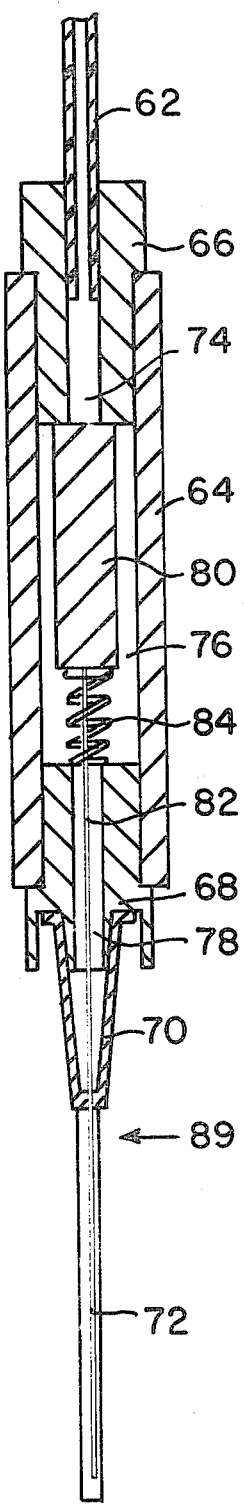
FIG. 3 is a cross-sectional view of the needle assembly of the embodiment of this invention illustrated in FIGS. 1 and 2.

Needle assembly 22 is shown in detail in FIG. 3. Basically needle assembly 22 includes cylindrical housing 64, tubing connector 66 (having chamber 74 therein), needle adapter 68 (having chamber 78 therein), and needle 89 (which consists of needle hub 70 and needle tubing 72).

Solution tube 62 is attached to tubing connector 66. Solution tube 62 forms a leak tight fit with tubing connector 66.

Chamber 76 is formed within cylindrical housing 64 by the inner walls of cylindrical housing 64, connector 66 and adapter 68. The solution feeds into chamber 76 through solution tube 62 and chamber 74. The solution then travels through output chamber 78 in needle adapter 68 into needle hub 70 and finally out the end of needle tubing 72.

Needle assembly 22 includes a self-cleaning device comprising weight 80, wire 82 and spring 84. Weight 80 is cylindrical in shape and is slidably located within chamber 76. Wire 82 is connected to the lower end of weight 80 and when needle assembly 22 is properly assembled and in place, extends through output chamber 78 and into needle tubing 72. Spring 84 encircles the top portion of wire 82 and is in abutment on its respective ends with weight 80 and needle adapter 68.

Figure 4:
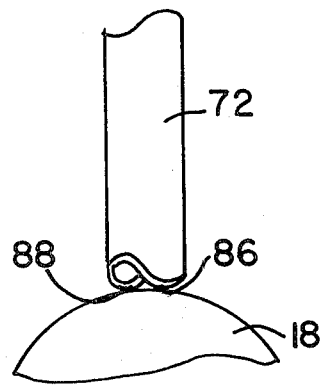
FIG. 4 is an exploded view of the tip of the needle of the embodiment of this invention illustrated in FIGS. 1–3, illustrating the needle coming into contact with an egg.

As shown in FIG. 4, in some embodiments of this invention the tip of needle tubing 72 is in the shape of a parabolic curve having two top points 86 and 88. These two top points 86 and 88 first contact eggs 18 when needles 84 are brought into contact with eggs 18. The shape of the tip of the needle tubing 72 is important so as to minimize the damage inflicted on the shells of eggs 18 when needles 89 are inserted into eggs 18.

When the embodiment illustrated in FIG. 4 is inserted into an egg 18, the top points 86 and 88 contact the egg shell first and puncture a hole having a diameter equal to the diameter of the tip of needle tubing 72 with a minimal risk of causing cracks or other damage to the area proximate to the point of impact of needle 22 onto egg 18. The use of a parabolic-shaped tip as opposed to a square-ended tip as taught by the prior art reduces the sudden impact energy transmitted to the shell. Therefore, the use of the tip shown in FIG. 4 greatly reduces the possibility of damage to the egg shell in a location other than the point of impact.

Egg injecting machine 10 operates as follows. When machine 10 is not in an injecting cycle, solenoid 32 is activated and holds solenoid arm 34 in its uppermost position (as shown in FIG. 1). Since the free end of arm 34 is fixedly attached to lower plate 24, lower plate 24 is also held in its uppermost position when solenoid 32 is activated. This places springs 28 in compression between lower plate 24 and upper plate 26.

Also, when lower plate 24 is in this uppermost position, needle assembly 22 is in its uppermost, or retracted, position with needle 72 suspended above stationary plate 16.

Moreover, if egg injecting machine 10 is empty, i.e. without a tray 20 of eggs 18 therein, cam plate 56 is in a position 180° from the position shown in FIGS. 1 and 2 (with the narrowest radius of cam plate 56 extending between rod 58 and bottom plate 14). Bottom plate 14, which rests on the edge of cam plate 56, is thus in its lowermost position.

To utilize egg injecting machine 10, a tray 20 of eggs 18 is inserted in the machine, in the position shown in the Figures, and attached to the support structure (not shown) such that tray 20 is positioned between bottom plate 14 and stationary plate 16. The type of support structure and devices for attaching tray 20 to the support structure are well known to a skilled artisan and thus are not illustrated in the Figures.

Once tray 20 is positioned in place, egg injecting machine 10 is ready to begin an injection cycle. Note that in the embodiment of the invention illustrated in the Figures, when tray 20 is properly positioned, the large ends of eggs 18 are pointing upward toward needle assemblies 22.

Egg injecting machine 10 is activated by any one of a number of manual or automatic control devices which are well known in the industry and thus not shown. This control device when activated, causes the motor which rotates shaft 58 to activate and rotate shaft 58 (and thus cam plate 56) 180° to the position shown in FIGS. 1 and 2. In this position, the largest radius of cam plate 56 is positioned between shaft 58 and bottom plate 14.

In this position, cam plate 56 has pushed bottom plate 14 up to its uppermost position. When bottom plate 14 is so elevated, egg positioning spring housings 48 contact the smaller ends of eggs 18 and push eggs 18 upward until eggs 18 contact stationary plate 16. In addition to positioning eggs 18 under holes 36 and in contact with stationary plate 16, egg positioning spring housings 48 also compensate for the different sizes of eggs 18 in a tray 20, since spring 54 will push eggs of all sizes up against stationary plate 16.

As eggs 18 are pushed upward by egg positioning spring housings 48, the large ends thereof interface with coil springs 46 and are properly positioned by coil springs 46 under holes 36. Coil springs 46 also function to hold eggs 18 in place during the injection process.

Once eggs 18 have been properly positioned as shown in FIG. 1 and are ready for injection, solenoid 32 is deactivated. This deactivation releases solenoid arm 34. Due to the gravitational pull on solenoid arm 34, lower plate 24 and needle assemblies 22, and also due to the force of springs 28 pushing lower plate 24 downward, lower plate 24 and thus needle assemblies 22 accelerate very rapidly downwardly. This rapid acceleration continues until lower plate 24 contacts engaging ends 42 of shock absorber 38. This contact occurs immediately after needles 89 have pierced the shells of eggs 18. At the time that needles 89 impact the shells of eggs 18, needles 89 are traveling at a velocity of between 50 and 150 inches per second, and most typically, at approximately 100 inches per second.

When lower plate 24 contacts the engaging ends 42, lower plate 24 is quickly decelerated. Shock absorbers 38 rapidly decelerate needles 89 from the velocity stated above to a velocity of 0.25 to 5 inches per second, and most typically, to a velocity of approximately 1 inch per second.

After bottom plates 24 have contacted shock absorbers 38 and have been decelerated by the same, bottom plates 24 continue downward at the greatly reduced velocity given above and next contact engaging ends 44 of speed controllers 40. Speed controllers 40 function to maintain the rate at descent of bottom plates 24 at the velocity given above and then function to stop bottom plate 24, and thus needle assembly 22, when needles 89 have travelled through air cells 90 and have punctured the air cell membranes 19 of eggs 18 and have travelled a very short distance into the amniotic fluid 91 near the nostrils of embryos 21 (see FIG. 2). The total distance needle 89 travels within egg 18 varies from 0.5 to 2 inches and is typically one inch for chicken eggs and ½ inches for turkey eggs.

Once the needles 89 have been inserted in eggs 18 the maximum desired distance, peristaltic pump 60 is activated and delivers the desired dosage of medicine through solution tubes 62 and needle assembly 22 into eggs 18.

Needles 89 are then withdrawn from eggs 18 by activating solenoids 32 which pull solenoid arms 34, and thus lower plate 24 and needle assemblies 22, upward back to the starting (or retracted) position shown in FIG. 1. Lastly, bottom plate 14 is returned to its initial position by activating the motor which turns shaft 58 and by having this motor rotate shaft 58 and thus cam plate 56, 180° back to the starting position. Tray 20 of eggs 18 can then be removed, with all the eggs 18 having been vaccinated.

As stated above, the embodiment of this invention illustrated in the Figures includes a needle self-cleaning device including weight 80, wire 82 and spring 84. This device operates as follows:

When needle assemblies 22 are not moving, and when needle assemblies 22 are rapidly descending toward eggs 18, weights 80 are held by springs (and by the fact that needle assemblies 22 are rapidly accelerating) against end plug 66. However, once bottom plate 24 has contacted shock absorbers 38 in its descent, thus decelerating needle assemblies 22, the momentum of weight 80 carries weight 80 downward at approximately the same velocity that needle assemblies 22 were travelling before needle assemblies 22 contacted shock absorbers 38, slowed only by springs 84. Stated differently, as needle assemblies 22 are rapidly decelerating, weights 80 are decelerating at a much slower rate, and are thus moving, within chambers 76, relative to cylindrical housing 64 from the upper position (as shown in FIG. 3) to a lower position.

When weight 80 moves relative to cylindrical housing 64, wire 82 moves relative to needle 89. This movement of wire 82 acts to clean out needle tubing 72 since any foreign material trapped within needle tubing 72 will be pushed out the tip by wire 82.

Therefore, each time egg injection machine 10 is run through a cycle, needle tubing 72 is cleaned by wire 82. It is important to note that the cleaning process does not transpire until needles 89 pierce the shells of eggs 18, but before needles 89 pierce air cell membrane 19. This is an important feature since any foreign matter that may get lodged in the end of needle tubing 72 during the piercing of the shells (for example, a piece of the shell or a particle of dirt located on the shell prior to impact) will be removed by wires 82 before needles 89 pierce the air cell membranes 19 of the eggs 18.

This insures that the needle tubing 72 will not be plugged up, preventing the proper dosages of medicine from being injected into eggs 18 and it also reduces the risks of the baby chicks being contaminated by the process since all foreign matter is removed from the needle tubing 72 prior to the entry of the needles 89 into the amniotic fluid 91.

This embodiment has many advantages over the prior art egg injection machines. Included in these advantages is the fact that immediately after needles 89 have penetrated the shells of eggs 18, needles 89 are quickly decelerated such that needles 89 are moving at a relatively slow speed when needles 89 penetrate the air cell membrane 19. This greatly reduces the risk to the birds within the eggs, because damage to the embryo 21 is minimal since if the needle tubing 72 should contact the embryo 21, the needle tubing 72 will gently push it out of the way. If the needles 89 have not been greatly decelerated after penetration of the eggs, the needles may inflict serious and possibly deadly injuries on the unhatched chicks.

Other improvements, modifications and embodiments will become apparent to one of ordinary skill in the art upon review of this disclosure. Such improvements, modifications and embodiments are considered to be within the scope of this invention as defined by the following claims.

I claim:

1. An egg injection machine comprising:
   a needle assembly having a needle;
   said needle assembly being movable between a retracted and an injecting position;
   means for positioning an egg such that said egg will be contacted by said needle when said needle assembly is in the injecting position;
   means for supplying matter to said needle assembly for injection into said eggs;
   means for accelerating said needle assembly as said needle assembly moves from the retracted towards the injecting position;
   means for decelerating said needle assembly immediately after said needle has pierced the shell of said egg to a slow velocity;
   means for continuing said needle into said egg at said slow velocity until said needle has pierced said egg a predetermined distance, and
   means for retracting said needle from said egg.

2. An egg injection machine according to claim 1 wherein said egg positioning means includes a first movable plate and a first stationary plate;
   said plates being spaced apart;
   said plates being designed and arranged to position said egg therebetween;
   one of said plates having a first hole therein for said needle to pass through.

3. An egg injection machine according to claim 2 wherein said egg positioning means includes means for cushioning said egg as said egg is positioned.

4. An egg injection machine according to claim 2 wherein said egg positioning means includes biasing means for properly positioning the egg between said plates.

5. An egg injection machine according to claim 4 wherein the biasing means includes a spring located within a housing, said housing having a movable member which engages said egg.

6. An egg injection machine according to claim 2 further comprising a second movable plate, said needle assembly being connected to said second movable plate.

7. An egg injection machine according to claim 2 wherein said accelerating means includes a second movable plate, a second stationary plate, and a spring;
   said needle assembly being attached to said second movable plate;
   said spring being positioned between said second movable and said second stationary plates;
   said spring being compressed when said needle assembly is in said retracted position.

8. An egg injection machine according to claim 7 wherein said egg positioning means includes means for receiving a tray of eggs and means for lifting said eggs out of said tray and into contact with said first stationary plate.

9. An egg injection machine according to claim 7 wherein said decelerating means includes a shock absorber;
   said shock absorber engaging said second movable plate to decelerate said needle assembly;
   said second movable plate engaging said shock absorber immediately after the needle has penetrated the egg.

10. An egg injection machine according to claim 9 wherein said continuing means includes speed controllers which said second movable plate contacts after said second movable plate engages said shock absorber.

11. An egg injection machine according to claim 7 wherein said retracting means includes a solenoid and a solenoid arm having at least an extended and a retracted position;
    the movement of said solenoid arm being controlled by said solenoid;
    said solenoid arm being attached to said second movable plate.

12. An egg injection machine according to claim 7 further comprising a rotatable cam;
    said cam interfacing with said first movable plate,
    wherein the rotation of said cam moves said first movable plate between an up and down position.

13. An egg injection machine according to claim 7 wherein all of said movable and said stationary plates are arranged to be approximately horizontal;
    said needle assembly being vertically in line with said hole.

14. An egg injection device according to claim 7 wherein said first stationary plate is located above said first movable plate, and
    wherein said second stationary plate is located above said first stationary plate.

15. An egg injection device according to claim 14 wherein said egg is inserted with the larger end pointing upward;
    said continuing means being designed and arranged such that said needle penetrates said egg a maximum distance of ½ to 2 inches.

16. An egg injection device according to claim 1 wherein said device is designed and arranged to position an egg with the larger end directed at the needle assembly;
    wherein said continuing means is designed and arranged to permit said needle to pierce the air cell membrane of the egg while said needle is moving at said slow velocity and to stop said needle shortly after said needle pierces said air cell membrane.

17. A method of injecting eggs comprising the steps of:
    providing a needle assembly having a needle and being connected to a source of injection matter;
    providing means for positioning an egg under said needle assembly;
    providing means for moving said needle assembly between a retracted and an injection position;
    inserting an egg within said positioning means;
    positioning said egg under said needle assembly;
    moving said needle assembly from said retracted towards said injection position and accelerating said needle assembly during this movement;
    decelerating said needle assembly immediately after said needle has pierced the shell of said egg to a slow velocity;
    slowly continuing the movement of said needle assembly towards the injecting position at a slow velocity until said needle reaches the injecting position;
    injecting said matter into said egg through said needle;
    retracting said needle from said egg.

18. A method of injecting eggs according to claim 17 wherein the moving means includes a solenoid and a solenoid arm, wherein the method further comprises the steps of:
    deactivating said solenoid before moving said needle assembly; and
    activating said solenoid before retracting the needle.

* * * * *